US006972733B2

(12) United States Patent
Maguire, Jr.

(10) Patent No.: US 6,972,733 B2
(45) **Date of Patent: *Dec. 6, 2005**

(54) METHOD AND APPARATUS FOR EYE TRACKING IN A VEHICLE

(76) Inventor: Francis J. Maguire, Jr., 88 Greenwood Dr., Southbury, CT (US) 06488

( * ) Notice: Subject to any disclaimer, the term of this patent is extended or adjusted under 35 U.S.C. 154(b) by 0 days.

This patent is subject to a terminal disclaimer.

(21) Appl. No.: 10/826,820

(22) Filed: Apr. 16, 2004

(65) Prior Publication Data

US 2004/0196214 A1 Oct. 7, 2004

Related U.S. Application Data

(63) Continuation of application No. 10/102,395, filed on Mar. 18, 2002, now Pat. No. 6,778,150, which is a continuation of application No. 08/364,718, filed on Dec. 27, 1994, now Pat. No. 6,359,601, which is a continuation-in-part of application No. 08/126,498, filed on Sep. 24, 1993, now abandoned.

(51) Int. Cl.[7] ................................................ G09G 5/00
(52) U.S. Cl. ............................................... 345/7; 345/8
(58) Field of Search ........................ 345/7–9, 156–158, 345/169; 348/15, 20, 42; 359/630; 351/208–211

(56) References Cited

U.S. PATENT DOCUMENTS

| | | | |
|---|---|---|---|
| 3,869,694 A | | 3/1975 | Merchant et al. |
| 4,048,653 A | | 9/1977 | Spooner |
| 4,303,394 A | | 12/1981 | Berke et al. |
| 4,348,186 A | | 9/1982 | Harvey et al. |
| 4,446,480 A | | 5/1984 | Breglia et al. |
| 4,582,403 A | | 4/1986 | Weinblatt ................... 351/210 |
| 4,843,568 A | | 6/1989 | Krueger et al. |
| 4,984,179 A | | 1/1991 | Waldern |
| 5,072,218 A | * | 12/1991 | Spero et al. ................ 340/980 |
| 5,086,404 A | | 2/1992 | Claussen |
| 5,130,794 A | | 7/1992 | Ritchey |
| 5,305,012 A | | 4/1994 | Faris ............................. 345/7 |
| 5,311,879 A | | 5/1994 | Yamada et al. |
| 5,345,944 A | | 9/1994 | Hongo et al. |
| 5,388,990 A | | 2/1995 | Beckman |
| 5,394,517 A | | 2/1995 | Kalawsky |
| 5,400,069 A | | 3/1995 | Braun et al. |
| 5,423,215 A | | 6/1995 | Frankel |
| 5,455,654 A | | 10/1995 | Suzuki |
| 5,615,132 A | | 3/1997 | Horton et al. |

FOREIGN PATENT DOCUMENTS

| | | |
|---|---|---|
| DE | 3712287 | 9/1988 |
| EP | 0330147 | 8/1989 |

(Continued)

OTHER PUBLICATIONS

"Spatially Dynamic Calibration of an Eye-Tracking System", White et al., IEEE Transactions on Systems, Man, and Cybernetics, vol. 23, No. 4, Jul./Aug. 1993, pp. 1162-1168.

(Continued)

*Primary Examiner*—Xiao Wu

(57) ABSTRACT

The attitude of a human eye with respect to a head coordinate system is monitored for the purpose of determining the visual axis and for providing a control signal for control purposes such as controlling an image. The position, attitude or both of the head with respect to a reference frame may also be monitored for translating and/or transforming the monitored visual axis into other reference frames. Transformations and translations of the visual axis into additional reference frames are also disclosed.

27 Claims, 6 Drawing Sheets

FOREIGN PATENT DOCUMENTS

JP 3-292093 12/1991

OTHER PUBLICATIONS

"Human-Computer Interaction Using Eye-Gaze Input", Hutchinson et al., IEEE Transactions on Systems, Man, and Cybernetics, vol. 19, No. 6, Nov./Dec. 1989, pp. 1527-1534.

"Eye Monitor: Microcomputer-Based Instrument Uses an Internal Mode to Track the Eye", Myers et al., IEEE 1991, COMPUTER, publication date Mar. 1991, pp. 14-21, vol. 24, Issue 3.

I.E. Sutherland, "A head-mounted three dimensional display," Fall Joint Computer Conference, 1968, pp. 757-763.

T. Caudell et al., "Augmented Reality: An Application of Heads-Up Display Technology to Manual Manufacturing Processes," Proc.Hawaii Int'l Conference, Jan. 1992, pp. 659-669.

M. Deering, "High Resolution Virtual Reality," Computer Graphics (Proc SIGGRAPH Conf.), vol. 26, No. 2, pp. 195-202, Jul. 1992.

M. Gleicher et al., "Through-the-Lens Camera Control," Computer Graphics, SIGGRAPH '92, vol. 26, No. 2, pp. 331-340.

P. Wellner, "Digital Desk," Communications of the ACM, vol. 36, No. 7, Jul. 1993, pp. 87-95.

D. Drascic et al., "ARGOS: A Display System for Augmenting Reality," INTERCHI '93, Apr. 24-29, 1993.

S. Gottschalk, "Autocalibration for Virtual Environments Tracking Hardware," Computer Graphics Proc., Annual Conf., Aug. 1993, pp. 65-72.

M. Bajura et al., "Merging Virtual Objects with the Real World: Seeing Ultrasound Imagery within the Patient," Computer Graphics, SIGGRAPH '92, Jul '92, v. 26, n 2, pp. 203-210.

E.K. Edwards et al., "Video See-through Design for Merging of Real and Virtual Environments," IEEE Virtual Reality Int'l Symposium, Seattle WA, Sep. 18-22, '93, pp. 223-233.

S. Feiner et al., "Knowledge-Based Augmented Reality," Comm ACM, Jul. 1993, vol. 36, No. 7, pp. 53-62.

P. Milgram et al., "Applications of Augmented Reality for Human-Robot Communications," Proc. '93: IEEE Int'l Conf. Intelligent Robots and Sys., Yokohama, Jul.1993, pp. 1467-1472.

M.W. Siegel, "Image Focusing In Space and Time," Report No. CMU-RI-TR-88-2, Feb. 1988, Carnegie Mellon University, pp. 1-11.

H. Yamaguchi et al., "Proposal for A Large Visual Field Display Employing Eye Movement Tracking," Proc. SPIE, vol. 1194, Philadelphia PA, Nov 8-10, 1989, pp. 13-20.

E.M. Howlett, "High-Resolution Inserts in Wide-Angle Head-Mounted Stereoscopic Displays," Feb 12-13, 1992, SPIE vol.1669 Stereoscopic Displays and Applications III, pp. 193-203.

Geiger et al, "Stereo and Eye Movement," ARPA Report, MIT, Jan. 1988.

Williams et al, "Eyetracking with the fiber optic helmet mounted display," Proc. 1987 Summer Computer Simulation Conf., pp 730-4

* cited by examiner

METHOD AND APPARATUS FOR EYE TRACKING IN A VEHICLE

CROSS-REFERENCE TO RELATED APPLICATIONS

This application is a continuation of U.S. application Ser. No. 10/102,395 filed Mar. 18, 2002 now U.S. Pat. No. 6,778,150, which is a continuation of U.S. application Ser. No. 08/364,718 filed Dec. 27, 1994 (now U.S. Pat. No. 6,359,601), which is a continuation-in-part of U.S. application Ser. No. 08/126,498 filed Sep. 24, 1993 (now abandoned).

TECHNICAL FIELD

This invention relates to sensing and, more particularly, to eye tracking.

BACKGROUND OF THE INVENTION

Various eye tracking techniques are known including oculometers, such as is disclosed in U.S. Pat. No. 3,462,604. An example of another type of eye tracker, based on the detection of Purkinje images, is disclosed in U.S. Pat. No. 3,712,716. Still another example of a type of eye tracker is disclosed in U.S. Pat. No. 4,561,448, based on electro-oculography. These are examples only as other types of eye trackers are known. These can be used to track one or more axes of the attitude, i.e., the pitch, roll and yaw of the eyeball in its socket. Roll, i.e., eyeball torsions can be neglected and are usually not measured. The translatory position of the eyeball within its socket is also not measured it being assumed stationary with respect thereto.

Various head tracking methods are known including Polhemus Navigation Sciences U.S. Pat. Nos. 3,983,474 and 4,017,858 and like patents such as shown in U.S. Pat. No. 3,917,412 to Stoutmeyer. These are used to measure the attitude, i.e., the pitch, roll and yaw of a pilot's head within a cockpit of a high performance aircraft. The translatory position of the head within the cockpit is not measured. It is evidently neglected and the center of rotation of the pilot's head is assumed to be stationary with respect to the aircraft.

It is known to combine the above described head and eye monitoring techniques as shown in U.S. Pat. No. 4,028,725 to Lewis. In that case, the helmet attitude measuring system of Stoutmeyer (U.S. Pat. No. 3,917,412) is combined with an eye angle (yaw) detector such as shown in U.S. Pat. No. 3,724,932 to Cornsweet et al. The line of sight of the eye angle of the observer with respect to his head plus the head angle with respect to the center line of the aircraft are measured to control a servoed mirror in front of the eye to keep it always looking at a fixed point on the display. Translatory head position is not measured with respect to any fixed coordinate system of the aircraft.

A contact-analog headup display disclosed in U.S. Pat. No. 5,072,218 showed symbolic images superimposed at selected points on a pilot's visual field as the aircraft overflies the earth. The position and attitude of the aircraft with respect to the earth and the attitude of the helmet with respect to the aircraft are monitored in order to convert a plurality of stored earth position signals into helmet coordinates. Selected points on earth, such as flightplan waypoints, viewable through the visor of the headup display by the pilot, have symbolic flags planted thereon by means of the display, i.e., the waypoint symbols remain "stuck" on the earth, in the eyes of the pilot, regardless of the attitude of the aircraft and regardless of the attitude of the helmet. Eye attitude is not measured nor is there any measurement of translatory head position with respect to the aircraft.

DISCLOSURE OF INVENTION

An object of the present invention is to provide a new eye tracking method and apparatus.

According to a first aspect of the present invention, an eye attitude monitor is combined with a head translatory position monitor in order to relate the eye's translatory position as well as its attitude to an arbitrarily selected reference coordinate system. Eye attitude can mean up to three axes of rotation (pitch, roll, yaw) about an origin of an eye coordinate system. The eye may be approximately assumed to be fixed in position with respect to the origin of a head coordinate system so that any translations in position of the eye with respect to the head may be neglected. This is a good assumption because the eye shifts its position very little in its socket. Its movements involve mostly "pitch" and "yaw" rotations. "Roll" (torsions) can be neglected as well, if desired. The assumption that the eye is "fixed" in translatory position with respect to the origin of the head coordinate system makes it possible to relate the eye's translatory position to that of the head's by a translatory transformation of the respective coordinate systems in a simple way, i.e., involving constants only and not requiring any monitoring of the eye's translatory position with respect to the translatory position of the head.

In further accord with this first aspect of the present invention, a head attitude monitor is added to relate the attitude of the eye to the arbitrarily selected reference coordinate system.

According to a second aspect of the present invention, the attitude of an eye is sensed with respect to an associated head coordinate system for providing an eye attitude signal, the attitude of the head coordinate system is sensed with respect to an arbitrarily selected first reference coordinate system such as a body, vehicle, or inertial reference coordinate system, and instead of sensing the translatory position of the head with respect to the selected first reference coordinate system it is assumed that the translatory position of the head is approximately fixed with respect to the selected first reference coordinate system and the translatory position of the selected first reference coordinate system is sensed with respect to an arbitrarily selected second reference coordinate system such as an inertial reference coordinate system; a visual axis vector signal is then provided referenced, as desired, to the selected first or second reference coordinate system for providing a control signal. Such may, but need not be for controlling an image according to the visual axis vector signal.

The present invention provides a new way to monitor an eye, i.e., with respect to more than one coordinate system, in order to open up new opportunities for eye-controlled devices including, but not limited to, image displays wherein image artifacts, nonuniform image characteristics and the like may be controlled in a way heretofore not possible or contemplated. See for example the positioning of a nonuniform resolution spot on a display according to a monitored visual axis such as disclosed in copending application U.S. Ser. No. 08/001,736, now U.S. Pat. No. 5,422,653, especially in connection with FIGS. 7(*a*) through 14 at page 29, line 3 through page 51, line 14 which is hereby incorporated by reference.

These and other objects, features, and advantages of the present invention will become more apparent in light of the detailed description of a best mode embodiment thereof, as illustrated in the accompanying drawing.

BEST MODE FOR CARRYING OUT THE INVENTION

Figure 1:
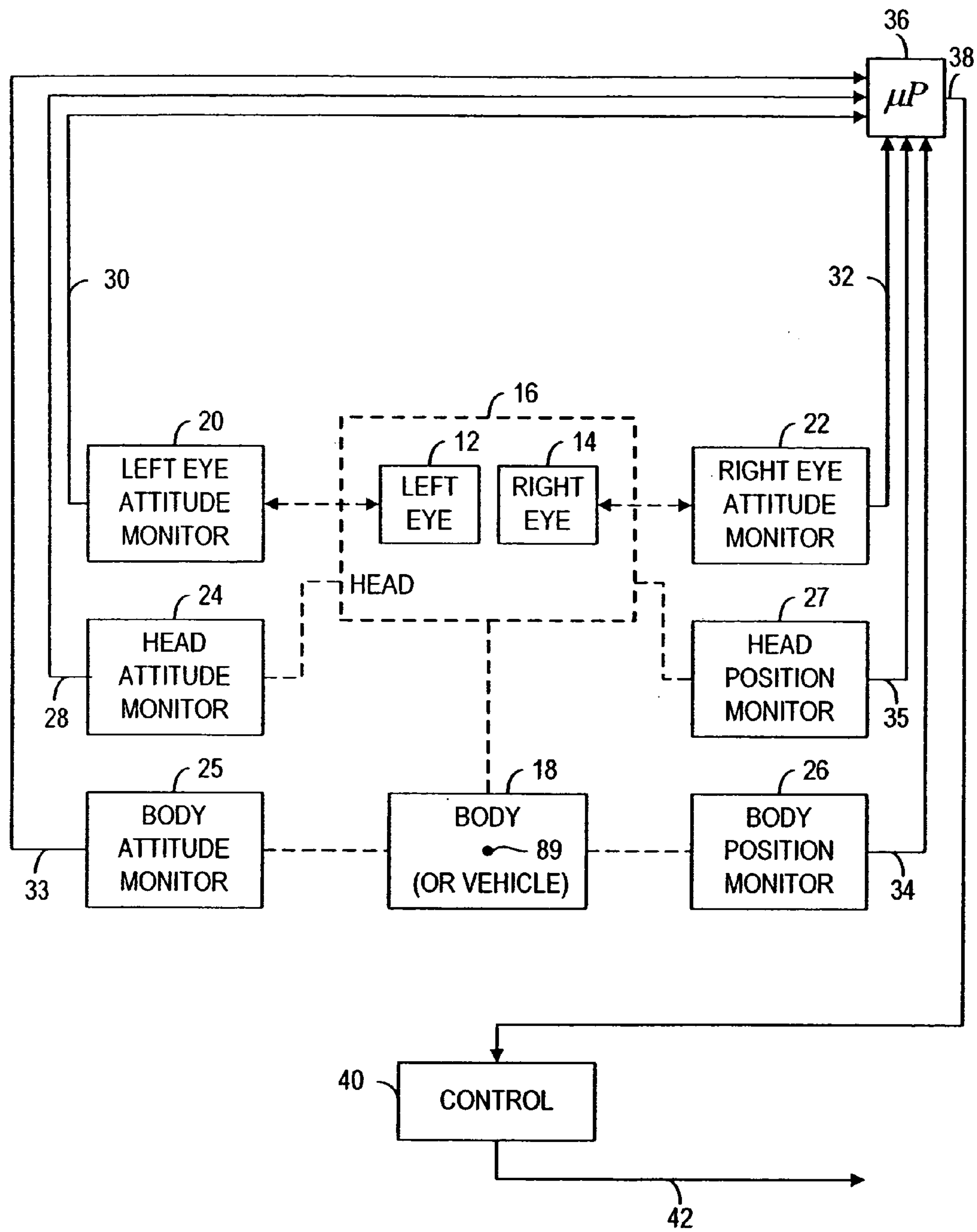
FIG. 1 shows an apparatus for eye tracking, according to the present invention, for providing a control signal.

FIG. 1 shows an apparatus 10, according to the present invention, for tracking the attitude of one or both eyes 12, 14 with respect to a head 16 attached to a body 18. By "attitude" is meant angular rotations of an eye visual axis with respect to arbitrarily selected axes of an eye coordinate system. E.g., such angular rotations may include a selected pitch axis (e.g., supraductions above and infraductions below a level visual axis), a selected yaw axis (e.g., abductions and adductions, respectively, from and away from a straight ahead "primary position" with respect to the nose), or the like.

It may be assumed that the origin of the eye coordinate system is fixed in relation to the origin of a head 16 coordinate system. It may therefore be related by constants, as discussed below. The head 16, according to the invention, is tracked at least in attitude with respect to an arbitrarily selected coordinate system such as the body, a vehicle within which the body is positioned, or another referent such as an inertial reference coordinate system. The apparatus 10 at least comprises one or more eye monitors 20, 22 for monitoring the attitude of each monitored eye with respect to the head 16.

In addition, the apparatus 10 includes a head attitude monitor 24 for monitoring the attitude of the head 16 with respect to the selected first coordinate system such as the body 18 or any other referent. It may also, but need not include a head translational position monitor 27 for monitoring the translatory position of the head 16 with respect to the first selected reference coordinate system or any other arbitrarily selected reference coordinate system. It may, but need not include an attitude monitor 25 for monitoring the attitude of the selected first coordinate system with respect to an arbitrarily selected reference coordinate system. Such can be a body attitude monitor 25 for monitoring the attitude of the body 18 or a vehicle body (within which the body 18 is positioned) with respect to an arbitrarily selected reference coordinate system such as, but not limited to, an inertial reference system. It may also, but need not, include a body translatory position monitor 26 for monitoring the translatory position of the first selected coordinate system such as the body 18 (or a vehicle body within which the body 18 is positioned) with respect to a reference system such as an inertial reference system. The attitude and position monitors 25, 26 need not be separate but can combine the functions of monitoring the attitude of the first selected coordinate system or vehicle with respect to another reference frame such as an inertial reference frame.

If the head attitude monitor 24 is of the type that is inherently referenced to an inertial reference frame then the function of the head position monitor 27 may be carried out by the head attitude monitor alone. In other applications it may be acceptable to assume that the head and body positions are relatively fixed with respect to each other and that the body position monitor 26 or the head position monitor 27 alone will suffice.

The monitors 20, 22, 24, 27, 25, 26 provide sensed signals on lines 30, 32, 28, 35, 33, 34, respectively, to a computer 36 which may be a microprocessor for carrying out at least the eye-head coordinate transformations described in connection with FIG. 2 or variations thereof. The computer 36 provides a tracking or visual axis signal on a line 38. This may be provided to any control device 40 in which it may be put to good use, such as an image control which in turn provides an image control signal on a line 42 for controlling images provided by a display (not shown). Such a control signal on the line 42 has utility in positioning an image artifact, for positioning a more highly detailed portion of an image with respect to a lesser detailed portion, for locating a portion of an image having more dynamic range than other portions of the same image, for positioning an image artifact, for acquiring a target for controlling a projectile, or for other purposes.

Figure 2:
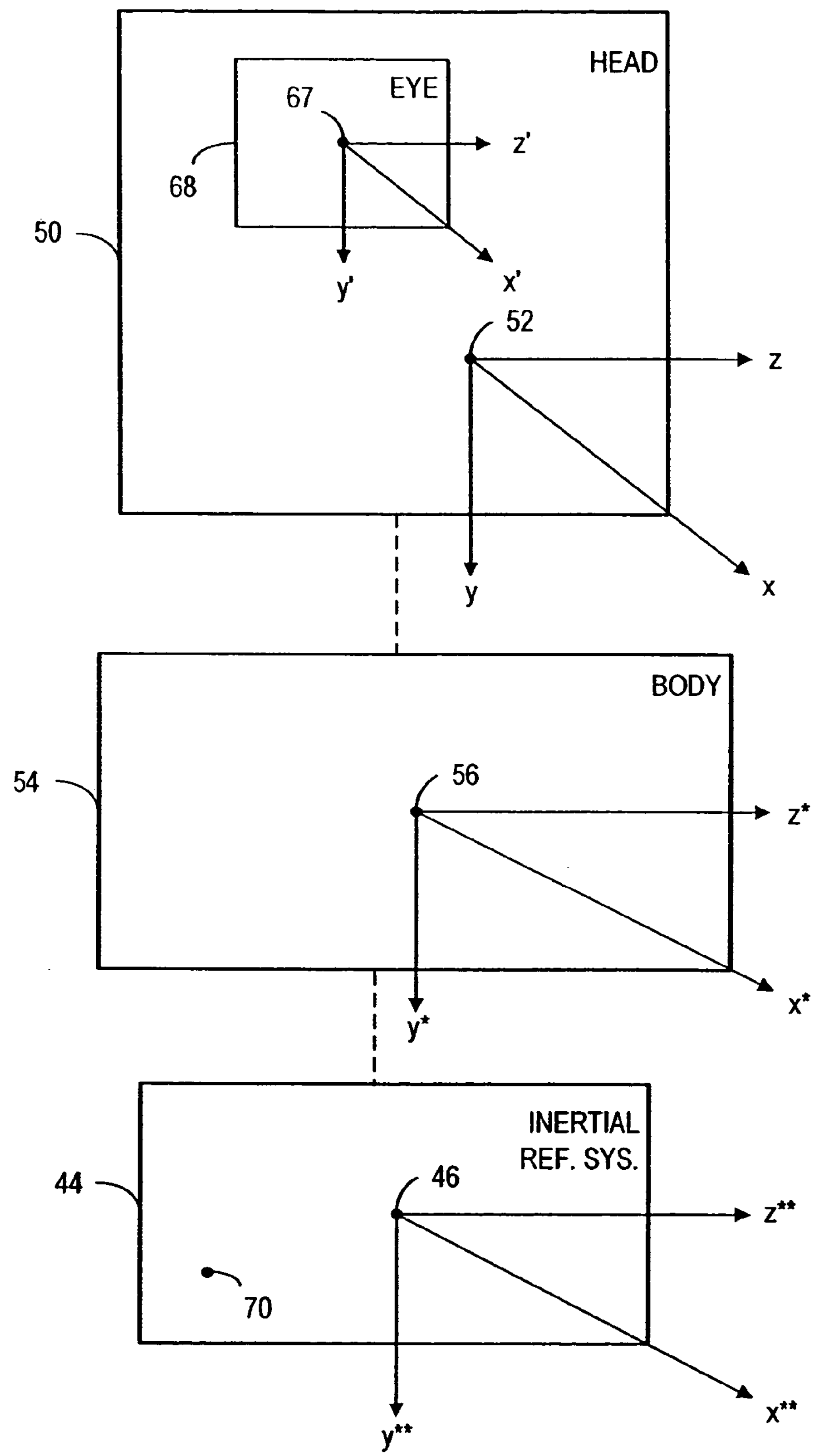
FIG. 2 shows a plurality of coordinate systems, for eye tracking, according to the present invention.

FIG. 2 shows four rectangular coordinate systems in an object space 44 which may be an inertial reference system, although other types of coordinate systems may be used as well. A viewer's head 50 is illustrated, similar to the head 16 of FIG. 1, having a three dimensional x, y, z coordinate system having an origin 52 in relation to a body 54 having a three dimensional x*, y*, z* coordinate system having an origin 56 and representative of a body associated with the head 50. The body may be a human body attached to the head or a vehicle body within which the human body is positioned. The body is shown in relation to the x, y, z coordinate system 44 which may be an earth reference frame or any object space having actual objects therein. The coordinate system 44 represents a ready coordinate reference system by which objects, the viewer's head 50, body and eyes, as well as virtual objects may be referenced to each other. It should be understood, however, that the actual measurement made by the monitors of FIG. 1 may, for example, measure the relation of the head axis with respect to the earth reference frame. In that case the body position and direction may be ignored. In such a case the body direction can still be monitored, e.g., in relation to the earth coordinate system, and the relation between the head axis and the body axis inferred, if desired, by their differences to the inertial referent. Such an approach would be useful where it would be undesirable or awkward to directly monitor the position and attitude of the head with respect to the body. Thus it will be understood that the translations and transformations of FIG. 2**, while instructive in teaching how to carry out the invention by the use of an illustrative series of related coordinate systems, such teachings may be subject to modification to serve different monitoring and signal processing embodiments of the invention.

FIG. 2 further illustrates another coordinate system (x', y', z') having an origin 67 fixed in an eye 68 of the viewer's head 50. For stereoscopic embodiments of the present invention, two such eye coordinate systems may be used, although only one is shown. The x, y, z head coordinate system is used as a reference for measurements of the attitude of the viewer's head. The x', y', z' eye coordinate system is used as a reference for measurements of the attitude of the viewer's eye.

The eyes 12, 14 of FIG. 1 may view objects in the object space 44 of FIG. 2 by means of a head-mounted display (not shown) mounted on the head 16 or 50. The display may be setup so that the space within which the viewer is located is not visible but only sensed visually by means of images. Or, the space may be made visible, with parts represented by images of virtual objects that may be infraposed, interposed or superimposed.

In order to properly position the object space's coordinate system 44 with respect to viewer's head coordinate system, as utilized by a head mounted display, according to the present invention, it is useful to conceive of the four separate coordinate systems having the separate origins 56, 52, 67 and reference frames freely translating and freely rotating with respect to each other and the origin 44 and its reference frame. In fact, the origins 52, 67 will be approximately fixed with regard to translations but viewing them as freely translatable does not unduly complicate the mathematical transformations and translation of coordinates. Such a translation can be omitted, however, in most applications. As pointed out earlier, the translational position and the attitude of the head can be measured directly with respect to the object space and the body's position and orientation ignored, if desired. Such is within the scope of the present invention.

With regard to translation, as known in the art of analytic geometry, two coordinate systems having their origins translating out of coincidence can be brought into coincidence by means of a parallel shift.

I.e., if the origin 46 of the object space has coordinates $\alpha_1$, $\alpha_2$, $\alpha_3$ with respect to the origin 56 of the coordinate system in the body 54, then the relations $$x^*=x^{**}+a_1$$

$$y^*=y^{**}+a_2$$

$$z^*=z^{**}+a_3$$

hold between the coordinates x*, y*, z* of a point 70 of space with respect to the body 54 of the viewer and the coordinates x, y, z of the same point 70 with respect to the object space 44**. If the body is in motion and its translatory position is monitored then $a_1$, $a_2$ and $a_3$ will be changing according to the monitored position of the body with respect to the inertial reference system.

Similarly, as is also known, with regard to rotation, two systems having the same origin, or having their origins brought into coincidence by the above transformation, but having their axes nonaligned, can be brought into alignment using direction cosines or using Euler angles or similar techniques which are or may be equally valid approaches.

In the case of direction cosines, each axis of one system is thought of as making an angle with each axis of the other system. The cosines of these angles are denoted by $a_{ik}$, where i and k run through the values 1, 2 and 3. In the following example, the first index refers to the x*, y*, z* system and the second index to the x, y, z** system. The index 1 corresponds to the x*- or x**-axis, 2 to the y*- or y**-axis and 3 to the z*- or z**-axis; that is, $$a_{11}=\cos(x^*,x^{**})a_{12}=\cos(x^*, y^{**})a_{13}=\cos(x^*, z^{**})$$

$$a_{21}=\cos(y^*,x^{**})a_{22}=\cos(y^*, y^{**})a_{23}=\cos(y^*, z^{**})$$

$$a_{31}=\cos(z^*,x^{**})a_{32}=\cos(z^*, y^{**})a_{33}=\cos(z^*, z^{**})$$

where the arguments refer to the angles in the planes formed by the specified axes.

The coordinates of an arbitrary point then transform according to the following equations:

$$x^*=a_{11}x^{}+a_{12}y^{}+a_{13}z^{**}$$

$$y^*=a_{21}x^{}+a_{22}y^{}+a_{23}z^{**}$$

$$z^*=a_{31}x^{}+a_{32}y^{}+a_{33}z^{**}.$$

The $a_{ik}$ are called "direction cosines." The Euler angle or the Euler theorem approach would be similar and will not be described in detail as it will be evident to one skilled in the art of analytic geometry as to how to proceed. Similarly, other methods of transformation are known, including more general methods, and by describing one such method it is certainly not intended to exclude others.

For the special case of the present invention, the body and object space coordinate systems may be viewed as being both translated and rotated with respect to each other at the same time. This case is a combination of the two cases considered above and leads to the following equations of transformation:

$$x^*=a_1+a_{11}x^{}+a_{12}y^{}+a_{13}z^{**}$$

$$y^*=a_2+a_{21}x^{}+a_{22}y^{}+a_{23}z^{**}$$

$$z^*=a_3+a_{31}x^{}+a_{32}y^{}+a_{33}z^{**}.$$

The image control 40 of FIG. 1 may be used to concentrate the imaging power of an image processor (not shown) in a relatively small area that tracks the viewer's visual axis. To do this, it is necessary to make two additional sets of transformations. I.e., if point 52 is the origin of the head and it is desired to further transform to head coordinates the same point 70 transformed above from object space to body coordinates. If the body's origin is translated to that of the head by sensed distances $b_1$, $b_2$, $b_3$, and the head coordinate system is rotated with respect to the body coordinate system as defined by nine direction cosines $b_{ik}$ (defined in a manner similar to that in which the $a_{ik}$ direction cosines were defined), then the coordinates of the same point 70 in head coordinates are:

$$x=b_1+b_{11}x^*+b_{12}y^*+b_{13}z^*$$

$$y=b_2+b_{21}x^*+b_{22}y^*+b_{23}z^*$$

$$z=b_3+b_{31}x^*+b_{32}y^*+b_{33}z^*,$$

and only one more transformation is required, i.e., from head to eye coordinates. This is done by the use of nine direction cosines $c_{ik}$, similarly used as follows:

$$x'=c_1+c_{11}x+c_{12}y+c_{13}z$$

$$y'=c_2+c_{21}x+c_{22}y+c_{23}z$$

$$z'=c_3+c_{31}x+c_{32}y+c_{33}z,$$

and the designer is then able to provide an image artifact on, in, or under an image, a highly detailed image in a small area, a greater dynamic image range in a small area of the overall image, or various combinations thereof, according to the present invention. In the last mentioned equations above, the eye may be assumed to be fixed in translatory position with respect to the head so that $c_1$, $c_2$, $c_3$ are constants. It should be realized that the order of transformations of coordinate systems described above may be carried out in any order or even without any particular order. The same may be said for translations. And if it is desired to omit a coordinate system or a degree of freedom in a given system, such may be done as well. For instance, it may be deemed acceptable to track only two degrees of freedom of an eye, e.g., ductions only, omitting torsions. It is even conceivable that tracking of only one degree of freedom is desired, such as horizontal ductions only. As another example, the position of the head may be assumed to be fixed with respect to the body. In that case, $b_1$, $b_2$, $b_3$ in the above mentioned equations will be constants instead of being monitored translational positions. Similarly, the head or body coordinate systems may even be omitted, for example.

Points in the object space coordinate system 44 expressed in head coordinates may be projected or transformed from the three dimensions of the object space to the two dimensions of the display 28 screen, i.e., a decrease in dimensionality (a dimensionality reduction is not a requirement or limitation, since a projection, for example onto a curved surface might be needed for some applications). This can be thought of as a shadow projection except being a contracted "shadow" rather than the expanded type of everyday experience.

Figure 3:
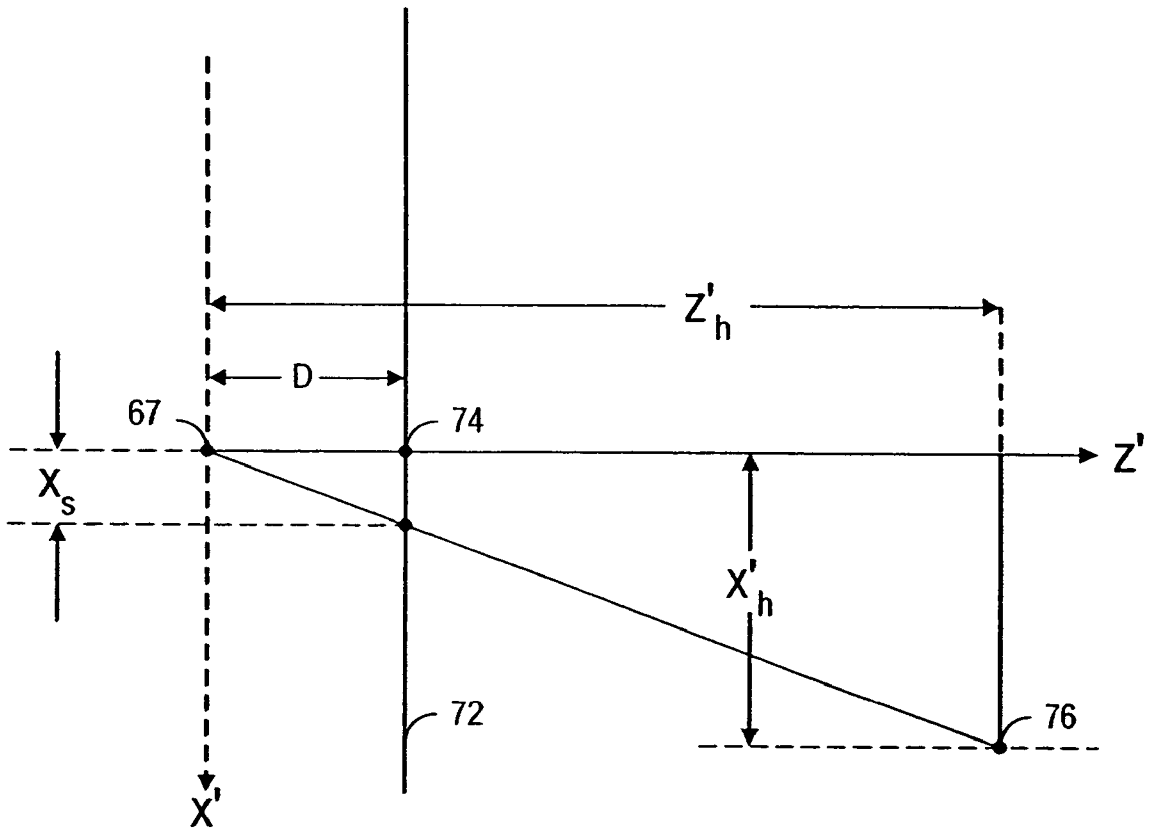
FIG. 3 shows an edge view of a display with coordinates related to FIG. 2.

For example, as shown by an edge-on view of a screen 72 in FIG. 3, and not by way of limitation, we can consider an origin 74 of the screen coordinate system for the illustrated eye 68 to be in a defined center of the screen 72 with the screen $x_S$- and $y_S$-axes in the plane of the screen parallel to the respective x'- and y'-axes of the eye coordinate system, for example. In that case, the eye z'-axis perpendicularly intersects the screen at its origin 74. The eye's point of view 67 lies on this axis at a distance D behind the screen at a point which may be translated with respect to the origin 52 of the head coordinate system.

Now, consider a point 76 with eye coordinates x',y',z'. (These coordinates may have been generated from object space coordinates using the transformations previously described). FIG. 3 represents the components of this point in the eye system's x'-z'-plane. Applying the well-known laws of similar triangles, it can be seen that if $x_S$ designates the x-component of the point in screen coordinates, $$x_S D = x_h'/z_h',$$

or, solving for $x_S$, $$x_S = D(x_h'/z_h').$$

Similarly, in the eye y'-z'-plane (not shown), $$y_S = D(y_h'/z_h'),$$

where $y_S$ is the y-component of the point in screen coordinates. As in all of the other coordinate transformations described previously, there are other methods of projection and corresponding methods for accomplishing such transformations. In this case, a particular transformation from three-dimensional space to two-dimensional space is illustrated, but it is not by any means intended to exclude such other transformations, projections or methods.

A refinement to the above illustrated approach is to modify the value of D for points near the edges of the screen, to maintain a constant or approximately constant relationship between the linear separation between the two points, in screen coordinates, and their angular separation at the viewer's eye. This may be desirable when the angles subtended at the eye by the screen edges are large.

One may desire to express the screen coordinates in a coordinate system having its origin in the top left corner of the screen, as is usual in the art of computer graphics. This may be effected by a simple translation between the screen coordinate system described above and the corner-originated screen system.

Figure 4:
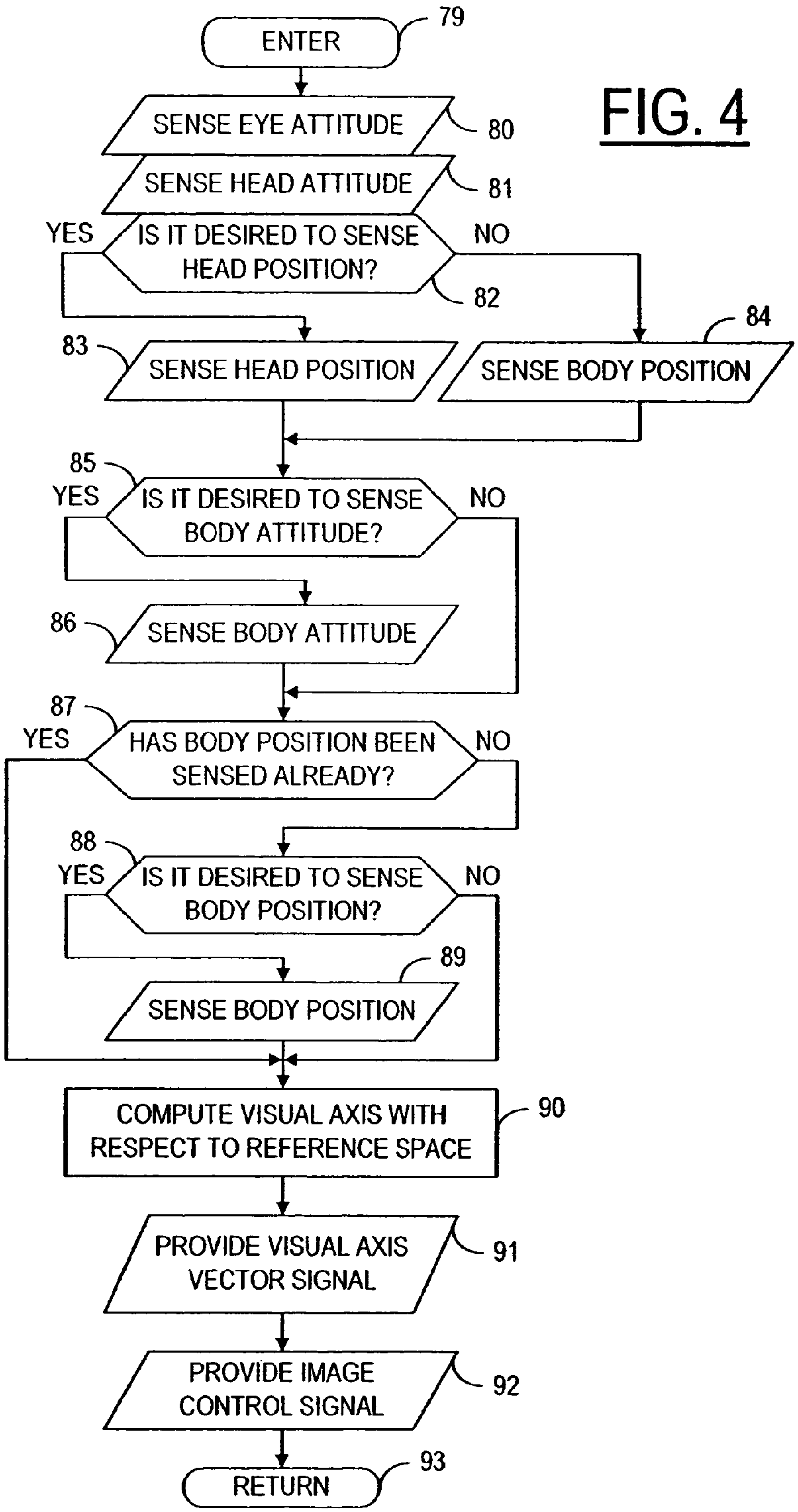
FIG. 4 shows a method for eye tracking, according to the present invention.

FIG. 4 shows a method for carrying out the present invention. After entering in a step 79, eye attitude, as shown in FIG. 2, is sensed by the one or more eye monitors 20, 22 of FIG. 1 in a step 80 and the signal 30 or the signal 32 or both of FIG. 1 are provided to the computer 36. Head 16 attitude, as shown in connection with FIG. 2, is sensed with respect to the body 54 or the object space 44 in a step 81 and the signal on the line 28 is also provided to the computer 36. A step 82 is next illustrated to show that in some application it may be desired to sense head position. If so, a step 83 is executed to sense head position. If not, a step 84 is executed to sense body position. In either event, a step 85 is next executed to determine if it is desired to sense body attitude. It should be realized that the step 82 need not be actually present in any particular embodiment of the invention, since it will already be known in advance by the designers whether it is desired to sense head position or not. Thus, the desired sensing steps would be executed directly without need for execution of a decision step, such as step 82. It will therefore be realized that the decision block 82 is merely illustrative of various design courses that might be selected for different embodiments of the invention. This may be said for steps 85, 87, 88 below, as well. If it is desired to sense body attitude, it is sensed in a step 86. A body center such as a selected point 89 in the body 18 of FIG. 1 or an origin 56 in a body 54 in FIG. 2, e.g., in the trunk area just below the head 16 or 50, respectively, may be used a body reference point for this purpose. If not, a decision step 87 is illustrative of whether or not body position was already sensed in the step 84. If not, a step 88 is executed to determine if it is desired to sense body position. If so, a step 89 is executed to do so. If not, or if the illustrative step 87 indicates that body position has already been sensed, and a step 90 is executed to compute the origin and direction of at least one visual vector of the eyes 12, 14 of FIG. 1 with respect to a selected reference frame such as the reference space 44 of FIG. 2. Once this is computed, a step 91 is executed to provide a visual axis signal on the line 38 of FIG. 1. The control 40 uses the signal on the line 38 to provide the control signal on the line 42 (which may be an image control signal) as indicated by a step 92 of FIG. 4. A return is then made in a step 93.

Figure 5:
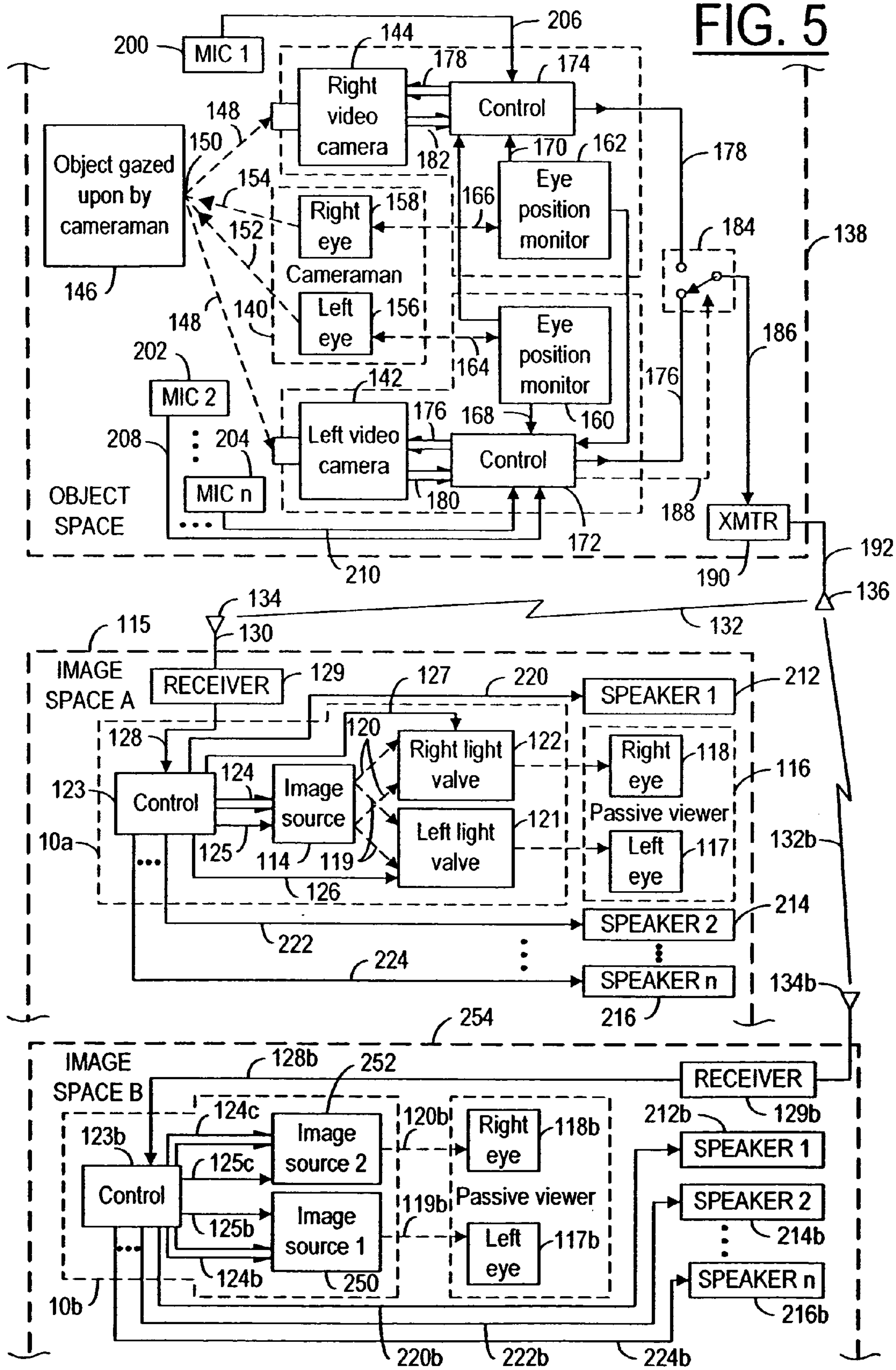
FIG. 5 shows an application of eye tracking, according to the present invention, for image control for a passive viewer.

The present invention may be used for a variety of purposes. For example, as shown in FIG. 5, a display 114 in an apparatus 10*a* can be made to operate in a manner suggested above in connection with the controls of FIG. 1. Controls similar to those of FIG. 1 are located in an object space 138 of FIG. 5. Nonuniform resolution images, images having nonuniform dynamic range, or the like, are provided on the display 114 in an image space 115 to a passive viewer 116 having a left eye 117 and a right eye 118. The images may be provided stereoscopically from the single image source 114 by providing alternate left and right eye images on lines 119, 120 to left and right light valves 121, 122. The visual axes of the passive viewer's eyes will naturally follow those small portions of the respective left and right images with more image information concentrated therein.

A control 123 provides image signals on a line 124 and a control signal on a line 125 to the display 114. For stereoscopic embodiments the control 123 may be used to provide control signals on lines 126, 127 for controlling the light valves 121, 122, respectively. The control 123 is responsive to an incoming encoded image signal on a line 128. The signal on the line 128 may be provided by a receiver 129 that is connected to an antenna signal line 130 responsive to a transmitted space signal 132 transmitted by a transmitting antenna 136 in an object space 138 and picked up by an antenna 134. Of course, the signal need not be broadcast but may be provided in any known way such as by video cassette, cable, optical fiber, satellite, or the like.

The signal on the line 130 may be created in the object space 138 by a cameraman 140 using one or more cameras such as a pair of cameras 142, 144 mounted on either side of the cameraman's head for picking up images of objects in the object space 138 such as an object 146 which provides reflected light on lines 148 from a point 150 gazed upon by the cameraman 140 by a conjunction of respective visual axes 152, 154 of left and right eyes 156, 158 of the cameraman 140. The eyes 156, 158 are monitored by respective eye position monitors 160, 162 which may be oculometers that send out and receive back infrared signals on lines 164, 166. As mentioned, there are of course other ways to monitor eyes besides oculometers. Sensed eye position signals are provided on lines 168, 170 to controls 172, 174 which play the role of the signal processor 36 of FIG. 1. It should be realized that the monitors 160, 162 will be similar to the eye attitude monitors 20, 22 of FIG. 1 and that the signals on the lines 168, 170 may include fully three axis eye attitude information. The controls 172, 174 provide camera control signals on lines 176, 178 which are similar to the signal on the line 38 of FIG. 1. In response, the cameras 142, 144 provide image signals on lines 180, 182 to the controls 172, 174 which provide a pair of encoded signals on lines 176, 178, which may be similar to the signal on the line 42 of FIG. 1 except in stereo as in the example given. These may be alternately switched (time division multiplexed) by a switch 184 of FIG. 5 onto a single signal line 186 as controlled by a signal on a line 188. A transmitter 190 may be used to boost the signal on the line 186 to provide a boosted signal on a line 192 to the antenna 136. As mentioned, broadcast is illustrated but any other method of image delivery after such image acquisition may be utilized.

The object space may include a plurality of microphones 200, 202, 204 arranged around the cameraman's head for providing a corresponding plurality of sensed sound signals on lines 206, 208, 210. One or both of the controls 172, 174 encodes the information in these sensed signals onto one or both of the signals onto the lines 176, 178 for use in speakers 214, 216, 218 in the image space 101 as provided by decoded signals on lines 220, 222, 224 by the control 116.

Additionally, as suggested in FIG. 1, the head 16 and even the body 18 of the cameraman 140 may be monitored in order to transform and/or translate eye coordinates into one or more related coordinate systems as suggested in FIG. 2. The viewer is then able to experience images, albeit passively, from the perspective of the cameraman as he moves about in the object space as if the viewer were the cameraman himself.

Instead of the single display 114 providing the separate halves of each stereopair alternately in succession, a pair of separate displays 250, 252 may be provided as shown in an image space B 254. Components shown in image space B are similar to those shown in image space A 115 and are similarly labeled. It should be realized that the images of the present invention need not be displayed stereoscopically but may be presented from a single point of view as well. The images may be provided as shown in approaches shown by U.S. Pat. Nos. 4,515,450 or 4,427,274 or PCT Patent WO 86/01310 in conjunction with, e.g., a pair of light shutter or polarizer glasses (not shown) such as shown in U.S. Pat. No. 4,424,529, or may be provided via image sources in a helmet for mounting on a viewer's head in an approach suggested by U.S. Pat. Nos. 4,636,866; 4,968,123; 4,961,626; 4,969,714; 4,310,849; the NASA 3-D Helmet (Electronic Engineering Times—Jan. 13, 1986, pp. 1 & 22); the Sony Visortron (Time, Dec. 28, 1992, p. 11; Popular Science, March, 1993, p. 26), or many other possible presentation approaches.

Figure 6:
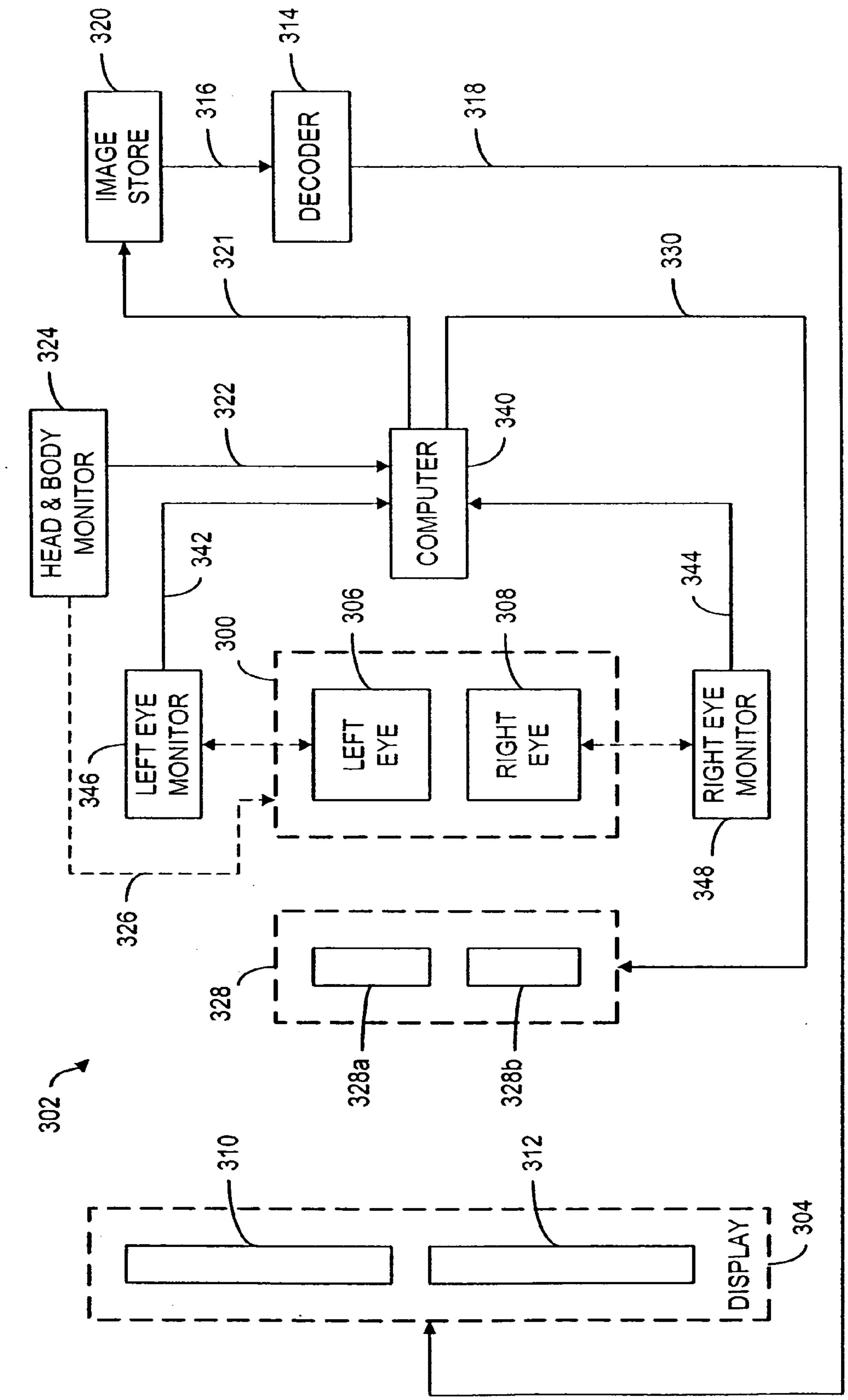
FIG. 6 shows another application of eye tracking, according to the present invention, for image control for an active viewer.

FIG. 6 shows another application of the present invention, whereby a viewer 300 in an image space 302 having a display 304 for presenting successive images to the viewer's eyes 306, 308. The display 304 may always provide successive images from the same perspective, i.e., nonstereoscopically, or may alternately provide the separate halves of stereopair images. Or, stereopairs may be provided by separate displays 310, 312 for separate halves of the stereopairs, one half for each eye. The display may be provided such as described in U.S. Pat. Nos. 4,515,450 or 4,427,274 PCT Patent WO 86/01310 in conjunction with, e.g., a pair of light shutter or polarizer glasses (not shown) such as shown in U.S. Pat. No. 4,424,529, or may be provided via image sources in a helmet for mounting on a viewer's head in an approach suggested by U.S. Pat. Nos. 4,636,866; 4,968,123; 4,961,626; 4,969,714; 4,310,849; the NASA 3-D Helmet (Electronic Engineering Times—Jan. 13, 1986, pp. 1 & 22); the Sony Visortron (Time, Dec. 28, 1992, p. 11; Popular Science, March, 1993, p. 26), or many other possible presentation approaches.

A decoder 314 is responsive to an encoded image signal on a line 316 for providing a display signal on a line 318 to the display 304. The encoded image signal on the line 316 may be provided by an image source 320 which may be an image store containing a very large plurality of selectable stored images such as may be consistent with "virtual reality" and which may be selected according to a selection signal on a line 321 that represents the visual axes or vectors of the eyes 306, 308 in the space 302. A viewer body part monitor signal on a line 322 from a viewer body part monitor 324 represents one or more monitors such as suggested in FIG. 1 is combined with the sensed eye attitude signals as suggested in connection with FIG. 2. Such a head part monitor may be provided as shown in U.S. Pat. Nos. 4,988,981; 5,097,252; 4,937,444; 4,542,291; or Polhemus Navigation Sciences U.S. Pat. Nos. 3,983,474 and 4,017,858 and like patents which are hereby incorporated in their entirety by reference. If a Polhemus monitor would not be applicable, other head mounted sensing devices such as inertial sensors could be used including accelerometers, any of the known type of gyros, or the like. The body part monitor 324 may sense motion of a selected part of the body of the viewer, such as a head or hand, or both, or arm, trunk or leg, as indicated by a sensing line 326 which, in the case of multiple body part monitoring, represents more than one signal. For example, the position of the body or head of the viewer 300 in the image space may be monitored and the attitude (pitch, roll and yaw) of the viewer's head with respect to the body or the object space may also be monitored as suggested previously.

A variable magnification device 328 may be situated in between the viewer 300 and the display 304 and is responsive to a control signal on a line 330 for providing images from the display 304 to the viewer 300 at various apparent distances. (A similar variable magnification device may be provided for the passive viewer of FIG. 5 except the degree of magnification will then be under the control of the cameraman's eyes. The device 328 of FIG. 6 may be a unitary device or may comprise separate devices **328*a*, 328*b*, one situated before each of the viewer's eyes 306, 308, respectively. A computer 340 (similar to the signal processor 36 of FIG. 1) is responsive to viewer eye monitor signals on lines 342, 344 and to the body part monitor signal(s) on the line 322 for providing the control signals on the lines 321, 330. The eye monitor signals on the lines 342, 344 are provided, respectively, by left and right monitors 346, 348 which may be oculometer devices such as invented by John Merchant of Honeywell. Such an oculometer is disclosed in U.S. Pat. No. 3,462,604. The left and right eye monitors 346,348 are responsive to left and right eye 306,308 movements, respectively. Numerous eye tracking devices, other than oculometers, are generally known in the art of eye tracking. An example of another type of eye tracker, based on the detection of Purkinje images, is disclosed in U.S. Pat. No. 3,712,716. Still another example of a type of eye tracker is disclosed in U.S. Pat. No. 4,561,448, based on electro-oculography. The abovementioned eye monitoring patents are hereby incorporated by reference in their entirety. These are examples only and should not be taken as limiting the choice of eye trackers or eye tracking methods, as any type of eye tracking method or apparatus capable of tracking the position of the visual axis of the cameraman's eyes 156, 158 or the viewer's eyes 306, 308 as encompassed by the monitors 160, 162 or 346, 348 as shown in FIGS. 5 & 6, respectively. The embodiment of the invention shown in FIG. 6 is of course for an active viewer while FIG. 5** shows a passive viewer.

Although the invention has been shown and described with respect to a best mode embodiment thereof, it should be understood by those skilled in the art that the foregoing and various other changes, omissions, and additions in the form and detail thereof may be made therein without departing from the spirit and scope of the invention.

What is claimed is:

1. Apparatus, comprising:

a translatory position monitor, responsive to a translatory position of a head, for providing a translatory position signal;

an eye monitor, responsive to a monitored eye in said head for providing a monitored eye signal;

a signal processor, responsive to the monitored eye signal and the translatory position signal, for providing a processed signal referenced to a vehicle coordinate system; and a control, responsive to the processed signal referenced to the vehicle coordinate system, for providing a control signal.

2. The apparatus of claim 1, further comprising a head attitude monitor, responsive to attitude of the head in the vehicle coordinate system, for providing a head attitude signal, wherein the signal processor is also responsive to the head attitude signal for providing the processed signal referenced to the vehicle coordinate system.

3. The apparatus of claim 2, wherein said apparatus further comprises a vehicle position monitor, responsive to position of said vehicle with respect to a reference coordinate system, for providing a vehicle position signal, wherein the signal processor is also responsive to the vehicle position signal for providing the processed signal.

4. The apparatus of claim 3, wherein said apparatus further comprises a vehicle attitude monitor, responsive to vehicle attitude in the reference coordinate system, for providing a vehicle attitude signal, wherein the signal processor is also responsive to the vehicle attitude signal for providing the processed signal.

5. A method for monitoring an eye, comprising the steps of:

sensing translatory position of a head with respect to a vehicle coordinate system for providing a sensed translatory head position signal;

monitoring an eye in said head for providing a monitored eye signal; and providing a control signal in response to the monitored eye signal and the sensed translatory head position signal.

6. The method of claim 5, further comprising the step of sensing attitude of said head for providing a sensed head attitude signal, and providing said control signal also in response to said sensed head attitude signal.

7. The method of claim 6, wherein said head is in a vehicle associated with said vehicle coordinate system, and wherein said method further comprises the step of sensing translatory position of said vehicle with respect to a reference coordinate system, for providing a vehicle translatory position signal, for providing said control signal in response also to said vehicle translatory position signal.

8. The method of claim 7, further comprising the step of sensing attitude of said vehicle in the reference coordinate system for providing a vehicle attitude signal, for providing said control signal in response also to said vehicle attitude signal.

9. Apparatus, comprising:

means for sensing visual axes of a pair of eyes in a head for providing sensed eye direction signals;

means for sensing translatory position of the head with respect to a vehicle coordinate system for providing a head translatory position signal;

means responsive to the sensed eye direction signals and the head translatory position signal, for providing an eyepoint signal indicative of a conjunction at a point in space of said visual axes; and means responsive to the eyepoint signal for providing a control signal.

10. The apparatus of claim 9, further comprising means for sensing attitude of the head for providing a head attitude signal and wherein the means responsive to the head translatory position signal and the sensed eye direction signals is also responsive to the head attitude signal for providing the eyepoint signal.

11. Apparatus, comprising:

a signal processor, responsive to a head translatory position signal indicative of a translatory position associated with a head translating with respect to a vehicle coordinate system and responsive to an eye direction signal indicative of direction of an eye in said head, for providing the eye direction signal referenced to said vehicle coordinate system; and a control, responsive to the eye direction signal referenced to the vehicle coordinate system, for providing a control signal.

12. The apparatus of claim 11, further comprising an eye monitor, responsive to said direction of said eye, for providing said eye direction signal.

13. The apparatus of claim 12, further comprising a head translatory position monitor, responsive to said translatory position associated with said head translating with respect to said vehicle coordinate system, for providing said head translatory position signal.

14. The apparatus of claim 11, further comprising a head translatory position monitor, responsive to said translatory position associated with said head translating with respect to said vehicle coordinate system, for providing said head translatory position signal.

15. The apparatus of claim 11, further comprising a head attitude monitor, responsive to attitude of the associated head in the vehicle coordinate system, for providing a head attitude signal, wherein the signal processor is responsive to the head attitude signal for providing the eye direction signal referenced to the vehicle coordinate system and wherein the control is responsive to the eye direction signal referenced to the vehicle coordinate system for providing the control signal.

16. The apparatus of claim 15, further comprising a vehicle position monitor, responsive to translatory position of said vehicle in the a reference coordinate system, for providing a vehicle translatory position signal, wherein the signal processor is responsive to the vehicle translatory position signal for providing the eye direction signal referenced to the reference coordinate system and wherein the control is responsive to the eye direction signal referenced to the reference coordinate system for providing the control signal.

17. The apparatus of claim 16, further comprising a vehicle attitude monitor, responsive to vehicle attitude in the reference coordinate system, for providing a vehicle attitude signal, wherein the signal processor is responsive to the vehicle attitude signal for providing the eye direction signal referenced to the reference coordinate system and wherein the control is responsive to the eye direction signal referenced to the reference coordinate system for providing the control signal.

18. Method for monitoring an eye in a head attached to a body, comprising the steps of providing, in response to a head translatory position signal indicative of a translatory position associated with said head translating with respect to a vehicle coordinate system and in response to an eye direction signal indicative of a direction of said eye in said head, an eye direction signal referenced to said vehicle coordinate system, and providing, in response to the eye direction signal referenced to the vehicle coordinate system, a control signal.

19. The method of claim 18, further comprising the step of sensing said translatory position associated with said head translating with respect to said vehicle coordinate system, for providing said head translatory position signal.

20. The method of claim 19, further comprising the step of sensing said direction of said eye in said head, for providing said eye direction signal.

21. The method of claim 18, further comprising the step of sensing said direction of said eye in said head, for providing said eye direction signal.

22. The method of claim 18, wherein said step of providing the control signal is also in response to a head attitude signal indicative of attitude of said head with respect to said vehicle coordinate system.

23. The method of claim 22, wherein said step of providing the control signal is also in response to a vehicle translatory position signal indicative of translatory position of a vehicle associated with said vehicle coordinate system with respect to a reference coordinate system.

24. The method of claim 23, wherein said step of providing the control signal is also in response to a vehicle attitude signal indicative of attitude of said vehicle with respect to said reference coordinate system.

25. Apparatus, comprising:

one or more monitors, responsive to translations in position of a human head attached to a body positioned in a vehicle, attitudinal changes of said head and eye movements of at least one eye in said head, for providing one or more monitored signals indicative of said head translations, said attitudinal changes and said eye movements; and a computer, responsive to said one or more monitored signals indicative of said head translations, said head attitudinal changes and said eye movements, for providing a processed signal indicative of said eye movements.

26. The apparatus of claim 25, further comprising a vehicle monitor, responsive to positional translations of said vehicle in a reference coordinate system, for providing a monitored signal indicative of said positional translations of said vehicle, wherein said computer is responsive to said monitored signal indicative of said positional translations of said vehicle for providing said processed signal indicative of said eye movements with respect to said reference coordinate system.

27. The apparatus of claim 26, further comprising a vehicle attitude monitor, responsive to attitude of said vehicle in said reference coordinate system, for providing a monitored vehicle attitude signal indicative of said attitude of said vehicle, wherein said computer is responsive to said monitored vehicle attitude signal for providing said processed signal indicative of said eye movements with respect to said reference coordinate system.

* * * * *